(12) United States Patent
Bruce et al.

(10) Patent No.: US 6,818,065 B2
(45) Date of Patent: Nov. 16, 2004

(54) SYSTEMS, DEVICES AND METHODS FOR APPLYING SOLUTION TO FILAMENTS

(75) Inventors: Mitchell V. Bruce, Shelby, NC (US); Thomas V. Thimons, Allison Park, PA (US); Dominic E. Verdini, Arnold, PA (US); Songhao Wang, Pittsburgh, PA (US); Paul A. Westbrook, Shelby, NC (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/891,007

(22) Filed: Jun. 25, 2001

(65) Prior Publication Data

US 2002/0197391 A1 Dec. 26, 2002

(51) Int. Cl.[7] .................................................. B05C 1/14
(52) U.S. Cl. ....................... 118/694; 118/693; 118/713; 118/714; 118/712; 118/234; 118/257
(58) Field of Search ................................. 118/693, 694, 118/712, 713, 714, 688, 234, 257; 427/8; 65/491, 447, 529, 450

(56) References Cited

U.S. PATENT DOCUMENTS

| | | | | |
|---|---|---|---|---|
| 3,401,542 A | * | 9/1968 | Evans | 68/202 |
| 3,848,565 A | * | 11/1974 | Schweppe | 118/234 |
| 3,920,431 A | * | 11/1975 | Reese | 65/443 |
| 3,997,306 A | | 12/1976 | Hedden | 65/3 |
| 4,192,252 A | * | 3/1980 | Paul | 118/258 |
| 4,192,663 A | * | 3/1980 | Schmandt et al. | 65/529 |
| 4,305,742 A | | 12/1981 | Barch et al. | 65/3.43 |
| 4,542,106 A | | 9/1985 | Sproull | 501/38 |
| 4,637,341 A | * | 1/1987 | Switall | 100/41 |

(List continued on next page.)

FOREIGN PATENT DOCUMENTS

| | | |
|---|---|---|
| DE | 38 32 374 | 3/1990 |
| EP | 0 481 401 | 4/1992 |
| WO | WO 93/15896 | 8/1993 |

OTHER PUBLICATIONS

K. Loewenstein, *The Manufacturing Technology of Glass Fibers*, (3d Ed. 1993) at pp. 25, 30–44, 47–60, 85, 107, 115–235, 237–291.

*Encylopedia of Polymer Science and Technology*, vol. 6 (1967) at pp. 505–712.

Stein, W. et al., "Abspruhendes Spulol an der Prazisions–Kreuzspulmaschine–ein einfaches Verfahren zur Reduzierung des Olverlustes" Chemiefasern Textil–Industrie, vol. 23, No. 2, Feb. 1973. pp. 123–125.

PCT/US02/20237 International Search Report, mailed Feb. 27, 2003.

*Primary Examiner*—Richard Crispino
*Assistant Examiner*—George R. Koch, III
(74) *Attorney, Agent, or Firm*—Andrew C. Siminerio; Dennis G. Millman

(57) ABSTRACT

Systems, devices and methods for applying solution to a filament include an applicator for applying at least a partial coating of a solution to a filament, comprising: an applicator surface operable to at least partially coat a filament with a solution; a first container operable to supply the solution to the applicator surface, a volume of the solution in the first container corresponding to a solution level in the first container; a second container operable to contain a supply of solution in fluid communication with the solution in the first container such that the solution in the second container has a solution level indicative of the solution level of the solution in the first container; and a detector for determining the solution level within the second container, the detector operable to control an adjustment of the volume of the solution in the first container such that the solution level in the first container is maintained within a predetermined range of levels.

32 Claims, 3 Drawing Sheets

U.S. PATENT DOCUMENTS

| | | | |
|---|---|---|---|
| 4,927,869 A | 5/1990 | Dana et al. | 523/502 |
| 5,171,634 A | 12/1992 | Soszka et al. | 428/376 |
| 5,352,392 A | 10/1994 | Johnson et al. | 264/22 |
| 5,405,443 A * | 4/1995 | Akimoto et al. | 118/668 |
| 5,460,119 A | 10/1995 | Maroszek | |
| 5,789,329 A | 8/1998 | Eastes et al. | 501/36 |
| 5,883,021 A | 3/1999 | Beer et al. | 442/172 |
| 5,908,689 A | 6/1999 | Dana et al. | 428/219 |
| 5,961,685 A | 10/1999 | Streets et al. | 65/529 |

* cited by examiner

SYSTEMS, DEVICES AND METHODS FOR APPLYING SOLUTION TO FILAMENTS

This invention relates to the application of coatings to filaments, and more particularly to systems and methods of applying a coating to a filament that forms a glass strand.

In the manufacture of textiles, including glass filament fabrics, it is a common practice to apply various coating solutions, e.g. sizes (also referred to as binders) and dyes to the surface of the advancing filaments as they are pulled from a bushing before being gathered into one or more strands. The sizing solution is applied to enhance or provide a given characteristic of or to the filament, such as improved tensile strength and abrasion resistance. Various methods and application devices may be utilized to apply the coating solution, such as a sprayer, pad, roll, or belt that transfers the solution from a reservoir to the filaments.

It is generally necessary to maintain a fresh supply of binder solution in the applicator in order to apply a suitable coating to the filaments. As such, an excess of binder solution may be supplied to the reservoir during operation and the excess solution is typically collected, returned to and recirculated by a binder circulation system. The excess binder collection device can be, for example, a weir, a vertically oriented tube disposed within the reservoir, a wall or channel having a given height into which the excess solution drains. However, the excess binder collection device can become clogged with dried solution, as a liquid-based portion of a non-circulating solution can dry upon exposure to air. Other applicator configurations use a float valve to control the amount of solution in the applicator. In particular, an indictor device floats on the surface of the solution and is connected to a supply system that will supply additional solution to the applicator when the level of the device gets too low. For more information concerning applicator configurations, see K. L. Loewenstein, *The Manufacturing Technology of Glass Fibres*, (Third Edition 1993) at pages 165–172, which is hereby incorporated by reference.

It is generally necessary to maintain a supply of solution having a known composition in the applicator reservoir, as the composition of the solution affects the final characteristics of the coated filament. However, due to openings to the reservoir in some systems, foreign matter can mix with the solution in the reservoir, thereby changing the composition of the solution and/or contaminating the solution. For example, in some systems, such as a glass filament production system, a liquid such as water is sprayed onto the hot filaments to cool them prior to applying the coating solution to the filaments. This cooling liquid can collect on the applicator housing and drip into the reservoir or onto the surface applying the solution to the filaments, thereby altering the known composition of the solution. Furthermore, openings in the applicator housing can allow other airborne contaminants, such as glass filaments or water droplets, to enter the housing and contaminate the solution. Additionally, these openings in the applicator housing can allow the high velocity air current associated with the passing filaments to circulate within the housing, thereby compounding the contamination problem by drawing in contaminants, and also serving to dry any non-circulating solution. Further, any contamination or dilution of the solution in the reservoir can contaminate or dilute the solution in other associated applicators if contaminated excess binder solution is collected and recirculated within a system of connected applicators.

Thus, embodiments of the present invention provide systems, methods and devices for applying an at least partial coating of a solution of a known composition to passing filaments, while eliminating the need to collect and recirculate excess binder solution, preventing binder from overflowing the applicator reservoir and becoming wasted and shielding the solution in the reservoir from contamination.

One aspect of the present invention is an applicator for applying at least a partial coating of a solution to a filament, comprising: an applicator surface operable to at least partially coat a filament with a solution; a first container operable to supply the solution to the applicator surface, a volume of the solution in the first container corresponding to a solution level in the first container; a second container operable to contain a supply of solution in fluid communication with the solution in the first container such that the solution in the second container has a solution level indicative of the solution level of the solution in the first container; and a detector for determining the solution level within the second container, the detector operable to control an adjustment of the volume of the solution in the first container such that the solution level in the first container is maintained within a predetermined range of levels. In one nonlimiting embodiment, the applicator further comprises shielding for covering the first container and directing excess external liquid on the shielding away from the solution in the first container, the shielding having an opening, wherein the applicator surface projects from the opening such that the filament is contactable with the applicator surface.

Another aspect of the present invention is an applicator for applying at least a partial coating of a solution to a filament, comprising: an applicator surface operable to at least partially coat a filament with a solution; a container operable to supply the solution to the applicator surface, a volume of the solution in the container corresponding to a solution level in the first container, the container further having an overflow level; shielding for covering the container and directing excess external liquid on the shielding away from the liquid in the container, the shielding having an opening, wherein the applicator surface projects from the opening such that the filament is contactable with the applicator surface; and a detector for determining the solution level within the container, the detector operable to control an adjustment of the volume of the solution in the container such that the solution level in the container is maintained within a predetermined range of levels which is below the overflow level.

Yet another aspect of the present invention is an applicator for applying at least a partial coating of a solution to a filament, comprising: a container operable to supply the solution, a volume of the solution in the container corresponding to a solution level in the container; an endless belt having an applicator surface operable to supply the solution to the filament, the endless belt rotatably supported by at least a first support and a second support, wherein the first support is at least partially positionable below the solution level and the second support is positionable adjacent to a contact area between the applicator surface and the filament, and wherein a portion of the endless belt that delivers the solution to the contact area forms a predetermined angle with respect to a horizontal axis that is predetermined angle is dependent upon a desired film thickness of the solution on the applicator surface; and adjusters to adjust the position of at least one of the first support or second support.

A further aspect of the present invention is a system for supplying and applying at least a partial coating of a solution to a filament, comprising: a main container operable to supply a solution; a local container in fluid communication with the main container for receiving the solution from the main container, a volume of the solution in the local container corresponding to a solution level in the local container; an applicator surface operable to receive the solution from the local container and apply an at least partial coating of the solution to the filament; an auxiliary container operable to contain a supply of solution in fluid communication with the solution in the local container such that the solution in the auxiliary container has a solution level indicative of the solution level of the solution in the local container; a flow controller positionable between the main container and the local container to control a flow of solution from the main container to the local container; and a detector for monitoring the solution level within the auxiliary container, wherein the detector is operable to generate a signal to the flow controller in response to the monitored solution level of the auxiliary container such that the solution level in the local container is maintained within a predetermined range of levels.

Another aspect of the present invention is a system for supplying and applying at least a partial coating of a solution to a filament, comprising: a main container operable to supply a solution; a local container in fluid communication with the main container for receiving the solution from the main container, a volume of the solution in the local container corresponding to a solution level in the local container, the local container having an overflow level; an applicator surface operable to receive the solution from the local container and apply an at least partial coating of the solution to the filament; shielding for covering the local container and directing excess external liquid on the shielding away from the solution in the local container, the shielding having an opening, wherein the applicator surface projects from the opening such that the filament is contactable with the applicator surface; a flow controller positionable between the main container and the local container to control the flow of solution from the main container to the local container; and a detector for monitoring the solution level within the local container, wherein the detector is operable to generate a signal in response to the monitored solution level to the flow controller such that the solution level in the local container is maintained within a predetermined range of levels, which is less below overflow level.

Still another aspect of the present invention is a method of supplying and applying at least a partial coating of a solution to a filament, comprising: storing a volume of a solution in a container having an inlet connected to a supply of the solution, the volume of the solution in the container being associated with a solution level in the container; coating at least a portion of an applicator within the container with the solution; contacting at least one filament with the applicator to at least partially coat the filament with the solution; monitoring the solution level within the container; generating a signal indicative of the monitored solution level; adjusting the solution level to a level within a predetermined range of levels based on the monitored solution level; and isolating the solution in the container from receiving any excess liquid accumulated on the container or any portion of the solution exceeding the overflow level. In one particular nonlimiting embodiment, the container is a first container and monitoring comprises positioning a second container proximate to the first container; interconnecting the first container with the second container such that solution can flow between the first and second containers and a solution level within the second container is indicative of a solution level within the first container, and monitoring the solution level of the solution in the second container, and adjusting comprises adjusting the solution level in the first container to a level within a predetermined range of levels based on the monitored solution level of the solution in the second container, wherein the predetermined range of levels is less than the overflow level.

The foregoing summary, as well as the following detailed description of nonlimiting embodiments of the present invention, will be better understood when read in conjunction with the appended drawings. In the drawings.

The present invention provide systems, methods and devices for applying a coating to filaments, e.g. a sizing composition, while eliminating the need to collect and recirculate excess sizing, thus improving the quality and uniformity of the coating compositions as applied to the filaments.

For the purposes of this specification, unless otherwise indicated, all numbers expressing quantities of speeds, dimensions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in any specific examples are reported as precisely as possible. Any numerical value, however, inherently contain certain errors necessarily resulting from the standard deviation found in their respective testing measurements.

Figure 1:
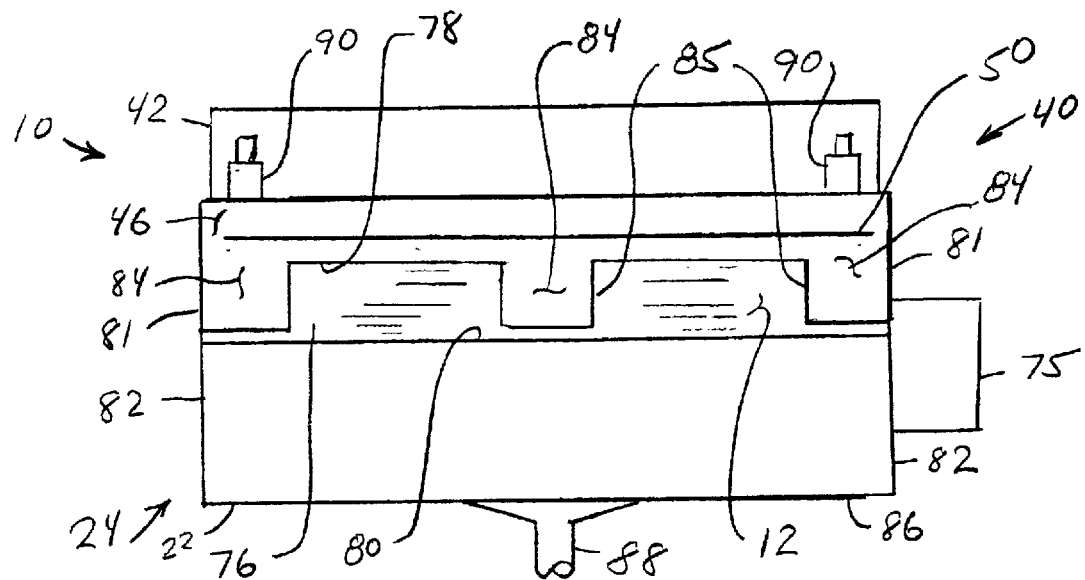
FIG. 1 is a front, plan view of an applicator incorporating features of the present invention, with portions removed for clarity.
Figure 2:
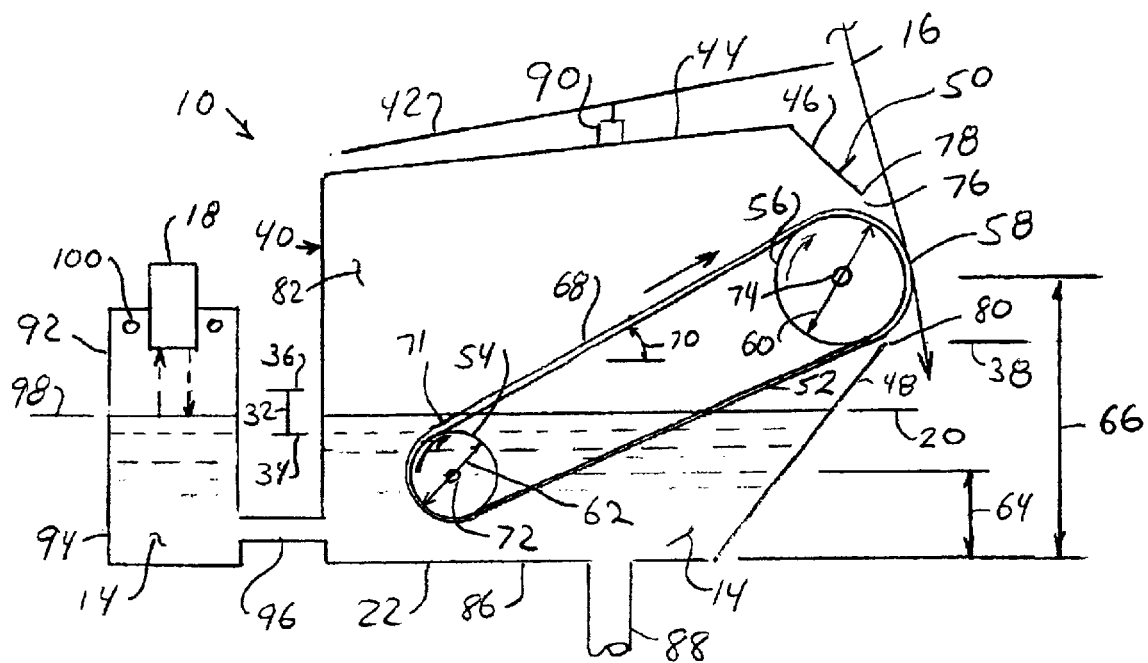
FIG. 2 is a cross-sectional view of the applicator taken along line 2—2 of FIG. 1.

Referring to FIGS. 1 and 2, in one nonlimiting embodiment of the present invention, applicator 10 having applicator surface 12 for applying a coating solution 14 to an array of advancing fibers or filaments 16 includes detector 18 for sensing and monitoring a solution level 20 in a main container, or reservoir 22 formed within a housing 24. In one nonlimiting embodiment, the coating solution is a sizing composition, as will be discussed later in more detail. Detector 18 is operable to generate signal 26 to a flow control mechanism 28 (shown in FIG. 5) to add a volume of incoming solution 30 to reservoir 22 for use in adjusting solution level 20 within a predetermined range of levels 32. The lower limit 34 of levels 32 corresponds to the minimum desired solution level within reservoir 22 and the upper limit 36 of levels 32 corresponds to the maximum desired solution level within reservoir 22 and is lower than an overflow level 38, as will be discussed later in more detail. Detector 18 thereby accurately detects the volume of solution 14 within reservoir 22 and generates flow control signals so that provisions to collect overflowing solution are not required. Further, housing 24 of applicator 10 includes shielding 40, which can include various combinations of a deflector 42, a top wall 44, a upper front wall 46, a lower front wall 48, and/or a gutter 50, for enclosing and covering at least a portion of reservoir 22 and for directing external excess liquid directed at and/or collected on housing 24 away from solution 14 within reservoir 22. Thus, shielding 40 substantially reduces the exposure of solution 14 within reservoir 22 to contaminants, while detector 18 sufficiently controls solution level 20 so that only the amount of solution 14 required to coat the filaments 16 is provided, thus eliminating the need to collect and recirculate excess solution, and thereby eliminate problems such as clogging and contamination of solution in connected applicators.

Applicator surface 12 can include a portion of a roller, belt, absorbent pad, or other structure capable of transferring solution 14 from reservoir 22 and at least partially coating filaments 16 with solution 14. For example and without limiting the present invention, applicator surface 12 can comprise a material having a surface texture suitable for carrying solution 14, such as but not limited to an elastomeric, graphite, or ceramic material. In the nonlimiting embodiment of the invention shown in FIGS. 1 and 2, applicator surface 12 corresponds to a portion of endless belt 52 rotatably supported by at least first support 54 and second support 56. First and second supports 54 and 56 can include rollers, bars, rods, and combinations thereof, and any other structure that allows endless belt 52 to rotate and transfer solution 14 from reservoir 22 to filaments 16. First support 54 is at least partially positionable below solution level 20 such that solution 14 can be transferred to the surface of endless belt 52. Second support 56 is spaced apart from first support 54 and positioned adjacent to a contact area 58 between endless belt 52 and filaments 16. Contact area 58 has a predetermined length corresponding to the desired longitudinal length of filament that is simultaneously contacted by the belt 52 when applying solution 14. The value of the predetermined length directly corresponds to the operational life of endless belt 52. In one nonlimiting embodiment of the invention, diameter 60 of second support 56 is as large as practicable to increase the contact length of filaments 16 on endless belt 52, and thus increasing the contact area 58. This reduces the contact stresses between the filaments 16 and belt 52 as well as reduces the bending stresses of the belt 52 itself. Stress reduction reduces wear of the belt 52 and thereby increases its useful life. Utilizing a second support 56 with a diameter 60 as large as practicable also reduces "blow back" at the applicator 10. The term "blow back" refers to the redirected flow of air currents entrained in the moving filaments 16 during contact between the filaments 16 and second support 56 at contact area 58 that blows solution off of the applicator surface 12. The air currents associated with blow back can further circulate within the applicator housing 24, causing pressure differentials that result in nonuniform film thickness of solution 14 on belt portion 68, thus inhibiting consistent application of solution 14 to filaments 16. In one nonlimiting embodiment, contact area 58 has a predetermined length in the range of 0.1 inch to 1 inch (0.25 cm to 2.54 cm). In other nonlimiting embodiments, the contact area 58 has a predetermined length in the range of 0.1 inch to 0.75 inch (0.25 cm to 1.91 cm) or 0.1 inch to 0.5 inch (0.25 cm to 1.27 cm). In other nonlimiting embodiments of the present invention, suitable predetermined values of diameter 60 of second support 56 can be in the range of 1 inch to 6 inches (2.54 cm to 15.54 cm), or 1 inch to 4 inches (2.54 cm to 10.16 cm), or 1 inch to 3 inches (2.54 cm to 7.62 cm). First support 54 has diameter 62 of a predetermined value sufficient to promote the transfer of solution 14 to endless belt 52. In order to minimize the space utilized by applicator 10 and to reduce cost of the assembly, in one nonlimiting embodiment first support diameter 62 is less than the second support diameter 60.

Further, first support diameter 62 and second support diameter 60, and/or first support height 64 and second support height 66, are defined to orient portion 68 of endless belt 52 at predetermined angle 70, with respect to a horizontal axis as shown in FIG. 2. Portion 68 of endless belt 52 is the portion of the belt extending between first support 54 and second support 56 and unsupported by supports 54 and 56 that delivers solution 14 to contact area 58. The desired value of predetermined angle 70 can vary depending on the desired film thickness of solution 14 to be carried by endless belt 52, the amount of solids in solution 14, the desired amount of solution 14 to be applied to filaments 16, the rotational speed of endless belt 52, and the desired amount of mixing of solution 14 in reservoir 22 by endless belt 52, among other factors. For example, in one nonlimiting embodiment, a desired film thickness of solution 14 on portion 68 of belt 52 being delivered to filaments 16 can be in the range of 50 microns to 400 microns. In other nonlimiting embodiments, the film thickness of solution 14 can be in the range of 100 microns to 300 microns, or 150 microns to 250 microns. Although not limiting in the present invention, suitable values of predetermined angle 70 are in the range of 0 degrees to 90 degrees with respect to the horizontal axis, for example 20 degrees to 70 degrees or 30 degrees to 60 degrees. In another nonlimiting embodiment, predetermined angle 70 is 45 degrees. Additionally, first and second supports 54 and 56, respectively, are attached to or can include first and second shafts 72 and 74, respectively, supported by housing 24. Motor 75, such as a motor drive from Baldor Electric Company of Ft. Smith, Ark., can be mounted to the outside of housing 24 and used to rotate either or both shafts 72 and 74 at predetermined speeds. In one nonlimiting embodiment, the belt 52 is rotated at a speed such that the speed of the belt at the contact area 58 substantially corresponds to the velocity of the advancing filaments 16. Although not required, in one nonlimiting embodiment, applicator 10 includes an adjustment device(s) (not shown) of any convenient type for changing the position of shafts 72 and/or 74 so that the depth of first support 54 in solution 14 and/or the angle 70 of belt portion 68 can be adjusted to provide the desired film thickness on belt 52. For example and without limiting the present invention, the side walls 82 of housing 24 through which shafts 72 and 74 extend can include slots that facilitate repositioning of the shafts.

It should be appreciated that the depth of first support 54 in solution 14 will impact the thickness of the solution film on belt 52. More specifically, the film thickness of solution 14 on belt 52 will depend, in part, on the angle at which belt 52 exits solution 14. It is apparent that small variations in the solution level 20 will significantly effect the exit angle of belt 52 and thus the solution film thickness. Furthermore, when these variations occur during fiber production, the amount of solution applied to filaments 16 can correspondingly vary. As a result, in order to provide a consistent and uniform film thickness on belt 52 despite solution level variations, in one nonlimiting embodiment of the invention solution level 20 and/or the position of first support 54 is maintained such that the angle at which belt 52 exits solution 14 is maintained relatively constant. This can be accomplished, for example, by maintaining at least a portion 71 of portion 68 of belt 52 constantly below the solution level 20. This will result in the belt 52 exiting the solution 14 at a constant angle 70, regardless of small variations in the solution level 20. In addition, setting the lower solution level 34 of range 32 no lower than the point at which portion 68 of belt 52 is no longer supported by first support 54 ensures that the exit angle will remain constant over the entire range 32 of solution levels. In one nonlimiting embodiment of the present invention, first support 54 is completely submerged in solution 14, i.e. it is positioned and maintained below the lower level 34 of the predetermined range of levels 32.

Applicator surface 12 extends outwardly toward filaments 16 through opening 76 in housing 24. The opening 76 is defined, in part, by positioning edge 78 of upper front wall 46 of front wall 44 and edge 80 of lower front wall 48 a minimal distance from applicator surface 12. This positioning of walls 46 and 48 of shielding 40 also inhibits contaminants from entering housing 24. Opening 76 is further defined by edges 81 of sidewalls 82 of housing 24. Further, either upper front wall 46 or lower front wall 48 can include one or more front walls 84, having side edges 85, that extend over and cover at least a portion of applicator surface 12 and thereby further shields contaminants from contacting selected portions of the applicator surface 12 and/or entering housing 24. Additionally, bottom wall 86 of housing 24 can include inlet 88, which can be connected to a fluid supply and associated control valves (shown in FIG. 5 and discussed later in more detail), through which incoming solution 30 is delivered to reservoir 22. It should be noted, however, that inlet 88 can form a portion of any wall of the housing 24 or can include a separate, non integral pipe. Although not required, in the nonlimiting embodiment of the invention shown in FIGS. 1 and 2, inlet 88 is in fluid communication with solution 14 at all times so as to reduce the drying of solution and the clogging of the inlet. In one nonlimiting embodiment of the invention, inlet 88 is positioned relative to first support 54 such that the flow of incoming solution 30 does not cause an uneven distribution of solution 14 on endless belt 52. For example, in the nonlimiting embodiment of the invention shown in FIG. 2, inlet 88 can be positioned within the forward, center portion of bottom wall 86, spaced away from first support 54.

Positioning inlet 88 within the central portion of applicator 10 also reduces the variability of the solution level 20 within reservoir 22 as additional solution 14 is added. More particularly, rather than supplying the solution at one end of the applicator and removing it form the opposite end, which can result in a flow gradient and level variation within the reservoir, feeding additional solution to the center of the reservoir 22 of the present invention will minimize variations in the solution level 20 due to incoming solution during filament coating.

In the nonlimiting embodiment of the invention shown in FIGS. 1 and 2, shielding 40 includes deflector 42, top wall 44, upper front wall 46, lower front wall 48, and gutter 50. Gutter 50 is a structure extending across at least a portion of the front face of applicator 10 and extending out from the surface of upper front wall 46. In one nonlimiting embodiment, gutter 50 is positioned just above edge 78 in close proximity to opening 76. Although not required, gutter 50 can include a structure having a planar, L-shaped, or U-shaped cross-section. In one nonlimiting embodiment, gutter 50 is attached to upper front wall 46 in a manner to form a seal between the gutter 50 and the wall 46, for example by welding, gluing, or mechanical fastening with a sealer, such as an elastomer layer. Gutter 50 is shaped and mounted in a fashion to collect excess liquid or other contaminants that can collect on housing 24 or that can be dropped toward opening 76. Gutter 50 further includes at least one open end, outwardly positioned from the edges of opening 76 to direct and release any collected excess fluid away from opening 76. Additionally, gutter 50 or portions thereof can be positioned at an angle with respect to a horizontal axis to direct collected liquids and contaminants toward the at least one open end.

Deflector 42 can include a plate or film extending over applicator 10 to at least partially intercept excess fluid, contaminants air currents entranined in filamnets 16 that can fall or be directed toward housing 24 of the applicator. Deflector 42 has a width that is typically at least as wide as opening 76, but can be more or less wide depending on a given application. For example and without limiting the present invention, a deflector 42 having a width greater than the opening exposing applicator surface can collect excess liquid falling on an angular path toward opening 76 that might not be collected by a narrower deflector. Further, deflector 42 has a depth sufficient to direct collected excess liquid or contaminants away from opening 76. Deflector 42 can include a front edge closely spaced from filaments 16, while a back edge of the deflector can be positioned, for example adjacent to a rear portion of top wall 44 of shielding 40 of housing 24. Additionally, deflector 42 can include adjustment mechanisms 90 for adjustably supporting the deflector 42 with respect to housing 24 and filaments 16. Adjustment mechanisms 90, such as but not limited to mechanical linkages, hinges, pistons, etc., can allow deflector 42 to be horizontally positioned, vertically positioned, and/or rotationally positioned, in order to achieve a desired orientation of the deflector 42. Additionally, adjustment mechanisms 90 can allow deflector 42 to be moved into position to cover applicator surface 12 when applicator 10 is not in use. Alternatively, deflector 42 can include an additional panel (not shown) that can be moved into position to cover opening 76 and applicator surface 12 when applicator 10 is not in use.

As discussed earlier, applicator 10 includes a detector 18 for sensing and monitoring solution level 20 within a predetermined range of levels 32, wherein the predetermined range of levels 32 is lower than the overflow level 38, and generating a response, such as an electrical signal or a mechanical motion, corresponding to the sensed solution level. As used herein, the term "solution level" means the actual level of solution within a reservoir, and the term "overflow level" is the lowest level of any wall defining the reservoir, such as upper edge 80 of lower front wall 48 of reservoir 20. Suitable nonlimiting examples of detector 18 include electrical detectors, mechanical detectors, energy wave detectors, ultrasonic detectors, optical detectors, resistance detectors, magnetic detectors, etc. In one nonlimiting embodiment, detector 18 is a non-surface contacting detector, i.e. the surface of the solution is not physically contacted by a float or other similar device but rather solution level is remotely determined. Detector 18 can be associated with applicator 10 in any manner that allows sensing of solution level 20. For example, in one nonlimiting embodiment, detector 18 can be mounted at housing 24. In another nonlimiting embodiment, the detector 18 at housing 24 is a non-surface contacting detector.

FIGS. 1 and 2 illustrate another nonlimiting embodiment of the present invention, wherein detector 18 is mounted at a pot 92 that is remotely positioned with respect to reservoir 22 of applicator 10. Pot 92 is an auxiliary container that includes a remote reservoir 94 of solution 14 that is in fluid communication with reservoir 22 through connector 96, such that the solution level 98 in pot 92 is indicative of the solution level in reservoir 22. In one nonlimiting embodiment, the solution level 98 in pot 82 corresponds to the solution level 20 in reservoir 22, i.e. the solution levels are the same. Although not required, in the particular embodiment shown in FIG. 2, the walls of pot 92 include holes 100 to equalize the pressure within the pot 92 and more easily allow the solution level of reservoir 94 to change is response to changes in the solution level in reservoir 22. While pot 92 can be remotely located with respect to housing 24, in the particular embodiment of the invention shown in FIGS. 1 and 2, pot 92 is located sufficiently close to housing 24 such that solution 14 in remote reservoir 94 can freely circulate with the solution in reservoir 22. In this particular nonlimiting embodiment, the remote location of pot 92 and detector 18 provide for ease in retrofitting conventional applicators, and for use of applicators as disclosed herein where there are space restrictions in the vicinity of housing 24. The use of pot 92 also provides a more reliable indication of the solution level 20 in reservoir 22. In particular, the motion of the applicator surface through the solution 14 can result in some splashing and other surface irregularities in the solution level 20 within the housing 24. The remote positioning of pot 92 relative to housing 24 as described herein allows connector 96 to act as a baffle so that the solution level 98 of the solution within pot 92 as monitored by detector 18 accurately reflects the true level 20 of the solution 14 within reservoir 22.

Connector 96 can include a structure such as a pipe, hose or tubing, having rigid or flexible characteristics, and constructed of metal, composite, plastic or any other material having a sufficiently low surface energy so as to inhibit the accumulation and adhesion of solution to its surface. Similarly, pot 92 and housing 24 can additionally be formed from plastic, metal and composite materials, or any other material having a sufficiently low surface energy so as to inhibit the surface accumulation and adhesion of solution. In one nonlimiting embodiment, pot 92 is formed from a high density material, such as Teflon® resin, connector 96 is formed from stainless steel tubing, and housing 24 is formed from stainless steel. In another nonlimiting embodiment, pot 92 includes stainless steel walls and removal top and bottom caps made from chlorinated polyvinyl chloride plastic. It should be noted that many other combinations of materials could be utilized.

Predetermined range of levels 32 includes any desired solution level 20 capable of supplying applicator surface 12 with a sufficient amount of solution 14 to transfer to filaments 16. For example, the sufficient amount of solution 14 can be an amount corresponding to a given amount of solids that are transferred to and at least partially coat the filaments 16, thereby insuring that the characteristics of the finished product formed by the filaments fall within predetermined specifications. As discussed earlier, by maintaining portion 71 of belt 52 below solution level 20, applicator 10 further provides a uniform and consistent solution film on the applicator surface 12, which in turn results in a more uniform coating on filaments 16. In order to consistently transfer a given composition of solution 14 to applicator surface 12, in one nonlimiting embodiment of the present invention, it is desirable to maintain the predetermined range of levels 32 within which solution level 20 falls, within a relatively narrow band. Without limiting the present invention, for a solution 14 applied to glass filaments, suitable examples of predetermined range of levels 32 include ranges within 1 inch to 6 inches (2.54 cm to 15.24 cm), for example ranges within 1 inch to 5 inches (2.54 cm to 12.7 cm), or 1 inch to 3 inches (2.54 cm to 7 62 cm).

Figure 3:
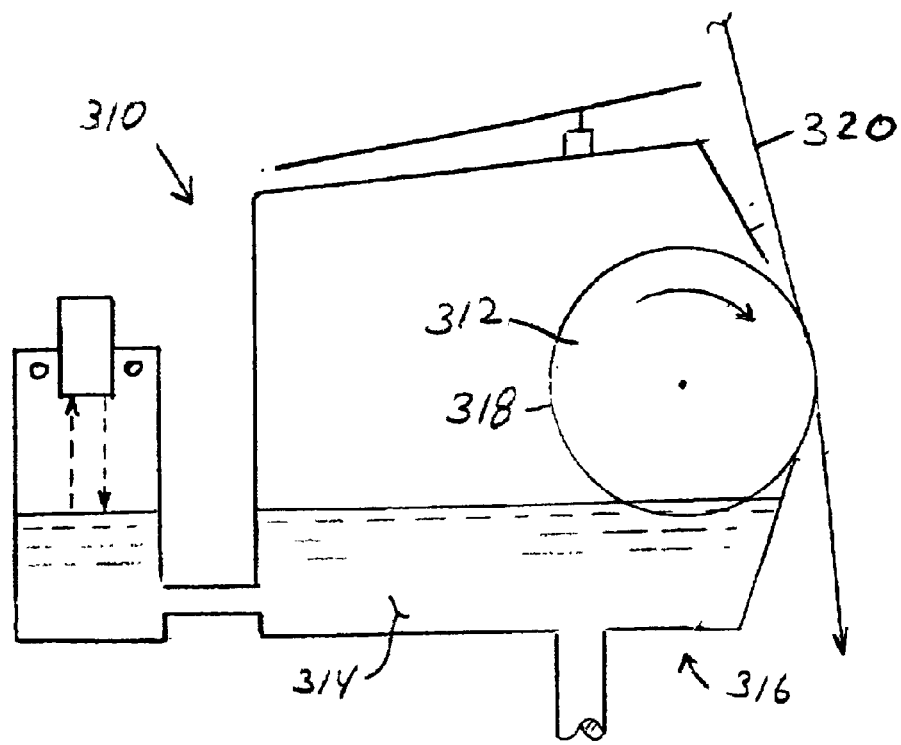
FIGS. 3 and 4 are cross-sectional views similar to FIG. 2 of alternate embodiments of applicators incorporating features of the present invention, with portions removed for clarity.
Figure 4:
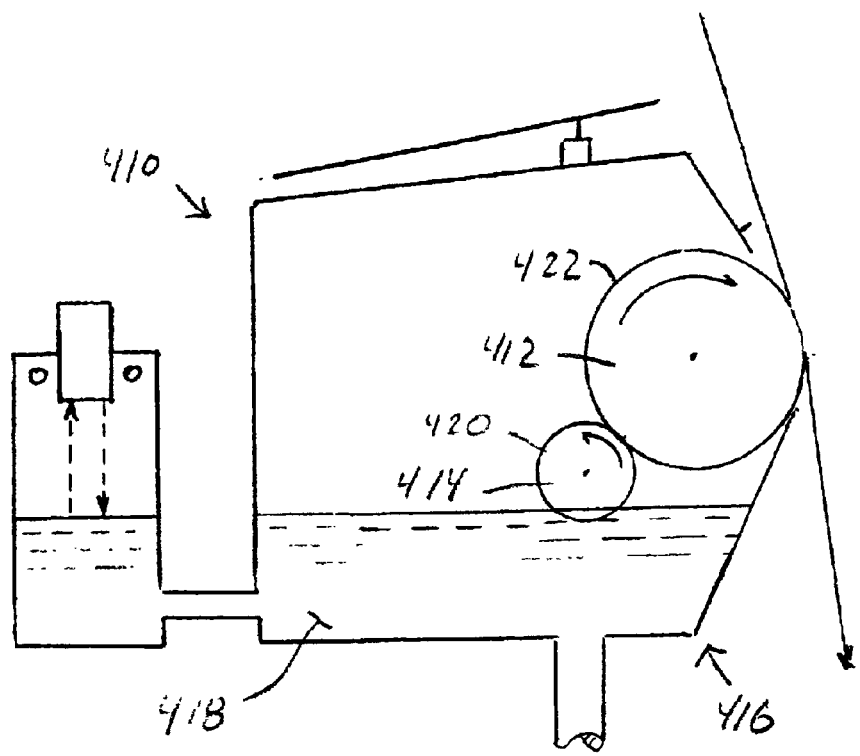

It should be appreciated that applicators incorporating feature of the present invention can includes applicator configurations different from that shown in FIGS. 1 and 2 and discussed above. For example and without limiting the present invention, FIG. 3 illustrates an applicator 310 with a single roller 312 at least partially submerged in solution 314 within housing 316. As roller 312 rotates, its surface 318 is coated with solution 314, which subsequently at least partially coats the surface of the fibers 320 contacting the roll surface 318. FIG. 4 illustrates another nonlimiting embodiment of the present invention wherein an applicator 410 includes a coating roller 412 and transfer roller 414 within housing 416. The transfer roller 414 is partially submerged in solution 418 and contacts coating roller 412 such that at least a portion of the solution 418 coating the surface 420 of transfer roller 414 is transferred to the surface 422 of coating roller 412, which in turn at least partially coats the surface of the fibers 424 contacting roller surface 422. Without limiting the present invention, rollers 312, 412 and 414 can compress a material having a surface suitable for carrying the solution, such as an elastomeric material, graphite, ceramic, etc.

Figure 5:
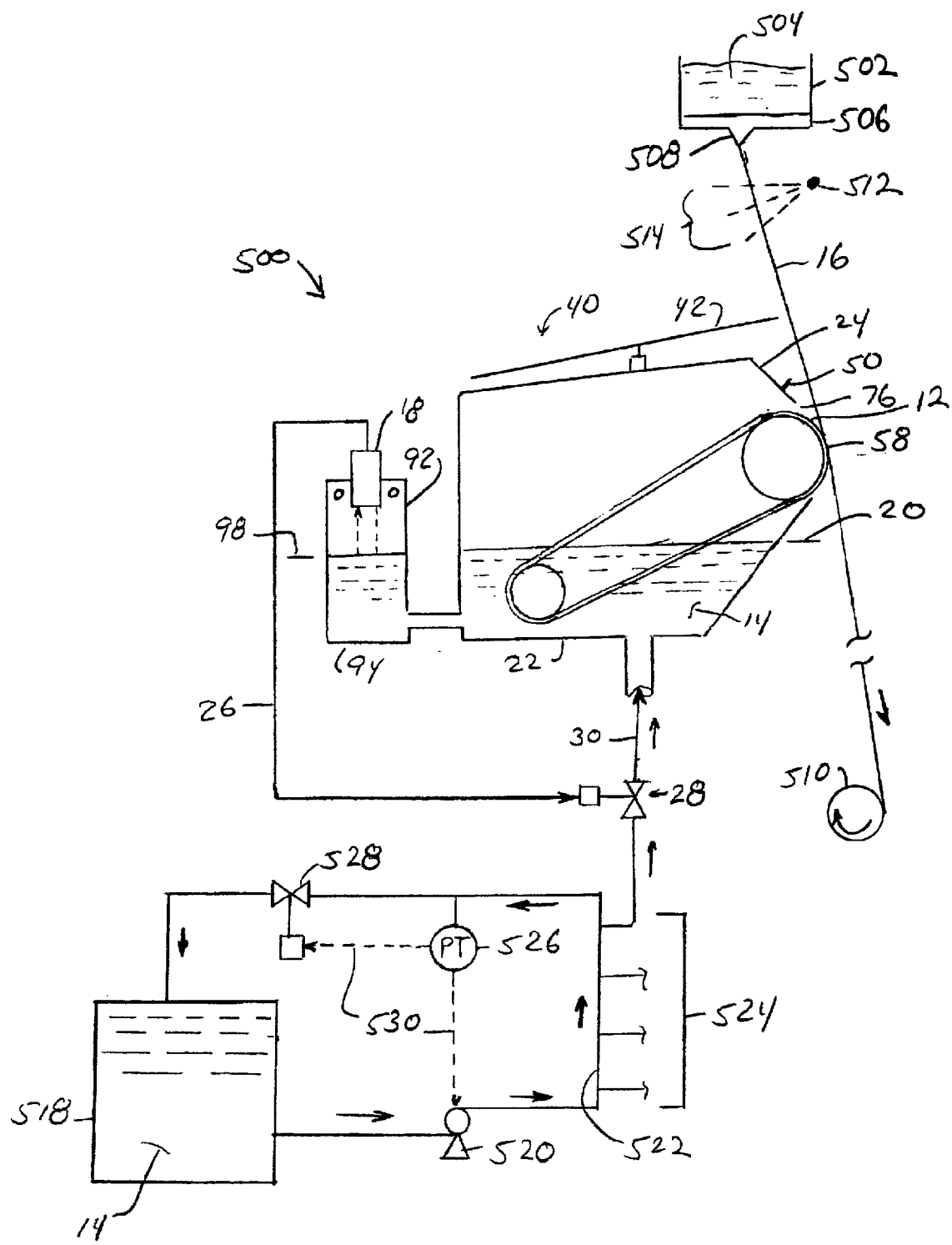
FIG. 5 is a schematic diagram of a system for supplying and applying a sizing to filaments incorporating features of the present invention.

The present invention can be used to apply any solution to coat filaments 16. As described earlier, in one nonlimiting embodiment, the solution is a sizing composition that is applied to one or more glass filaments. In particular and without limiting the present invention, FIG. 5. shows a sizing supply system 500 for supplying and applying sizing solution to glass filaments that uses an applicator of the type disclosed herein. As used herein, the terms "size", "sized" or "sizing", refer to coating compositions commonly applied to the filaments immediately after formation. Referring to FIG. 5, filaments 16 are supplied from a glass melting furnace or forehearth 502 containing a supply of a fiber forming molten glass 504 and having a metal bushing 506 attached to the bottom of the forehearth 502. The molten glass 504 is drawn through a plurality of nozzles 508 in the bushing 506 and attenuated by a winder 510 or some other fiber pulling device to form glass filaments 16. Sprayers 512 can be used to direct a spray 514 of coolant, typically water, at the newly foamed filaments 16 to cool them after being drawn from the bushing 506. For clarity in the drawing, the ceramic materials, cooling tubes and fins surrounding the metal bushing have been omitted. Alternatively, the system 500 can be, for example, a forming device for synthetic textile fibers or strands in which fibers are drawn from nozzles, such as but not limited to a spinneret, as is known to those skilled in the art. Typical forehearths and glass fiber forming arrangements are shown in *Loewenstein* at pages 85, 107 and pages 115 to 235, which is hereby incorporated by reference.

As discussed earlier, after the glass filaments 16 are drawn from the bushing 506, they are contacted with an applicator 10 to apply a coating or sizing composition to at least a portion of the surface of the glass filaments 16 to protect the fiber from abrasion during subsequent processing. Typical sizing compositions can include as components, among other constituents, film-formers, lubricants, coupling agents, emulsifiers and water. Nonlimiting examples of sizing compositions that can be used in the present invention are disclosed in assignee's U.S. Pat. No. 3,997,306 (see column 4, line 60 through column 7, line 57); U.S. Pat. No. 4,305,742 (see column 5, line 64 through column 8, line 65); U.S. Pat. No. 4,927,869 (see column 9, line 20 through column 11, line 19); U.S. Pat. No. 5,883,021 (see column 6, line 7 through column 9, line 18); and U.S. Pat. No. 5,908,689 (see column 5, line 48 through column 7, line 34), which are hereby incorporated by reference. Additional information and further nonlimiting examples of suitable sizing compositions are set forth in *Loewenstein* at pages 237–291, which is hereby incorporated by reference.

A gathering device (not shown) typically mounted below applicator 10, gathers selected at the forming filaments 16 to form one or more strands 516. As used herein, the term "strand" means a plurality of filaments. The strands typically have 100 to 15,000 fibers per strand, for example 200 to 7,000 fibers, and are drawn through the gathering device 32 at speeds of 2,500 to 18,000 feet per minute (762 to 5486 meters per minute). Glass filaments that can be coated using an applicator as disclosed herein can be formed from any type of fiberizable glass composition known to those skilled in the art, including those prepared from fiberizable glass compositions such as "E-glass", "A-glass", "C-glass", "D-glass", "R-glass", "S-glass" and E-glass derivatives. As used herein "E-glass derivatives" means glass compositions that include minor amounts of fluoride and/or boron, and preferably are fluorine-free and/or boron-free. Furthermore, as used herein, "minor amounts of fluorine" means less than 0.5 weight percent fluorine, such as, for example, less than 0.1 weight percent fluorine, and "minor amounts of boron" means less than 5 weight percent boron, such as, for example, less than 2 weight percent boron. Basalt and mineral wool are examples of other fiberizable glass materials useful in the present invention. In one nonlimiting embodiment, the glass fibers can be formed from E-glass or E-glass derivatives. Such compositions are well known to those skilled in the art. If additional information is needed, such glass compositions as well as fiberization methods are disclosed in *Loewenstein* at pages 30–44, 47–60,115–122 and 126–135 and U.S. Pat. No. 4,542,106 (see column 2, line 67 through column 4, line 53) and U.S. Pat. No. 5,789,329 (column 2, line 65 through column 4, line 24), which are hereby incorporated by reference.

The glass filaments can have a nominal fiber diameter ranging from 5.0 to 35.0 micrometers (corresponding to a filament designation of D through U and above). For further information regarding nominal fiber diameters and designations of glass filaments, see *Loewenstein* at page 25, which is hereby incorporated by reference.

The present invention is also useful in coating filaments or strands formed of materials other than glass filaments ("non-glass filaments"). Suitable non-glass filaments which can be coated using the present invention are discussed at length in the *Encyclopedia of Polymer Science and Technology*, Vol. 6 (1967) at pages 505–712, and U.S. Ser. No. 08/828,212 at page 15, line 21 through page 17, line 10, which are hereby incorporated by reference.

As discussed earlier, after the filaments 16 are drawn from the bushing 506, they are contacted with an applicator 10 to apply a coating or sizing composition to the surfaces of the glass fibers to protect the fiber surface from abrasion during processing. With continued reference to the particular sizing supply system 500 shown in FIG. 5, a given composition of solution 14 is stored at a main storage tank or container 518. Pump 520 transfers solution 14 from tank 518 to header 522, which connects to a plurality of pipes 524 each associated with one of a plurality of applicators (only applicator 10 is shown). Although not limiting in the present invention, solution 14 within header 522 can be maintained at a desired pressure, e.g. by any combination of pressure transducer 526, control valve 528 and/or pump 520. In one particular nonlimiting embodiment, pressure transducer 526 senses the pressure within header 522 and sends signal 530 to control valve 528 and/or pump 520, which in turn adjusts the flow of solution through the control valve and/or the speed of the pump, in order to modify the pressure within the header 522 to achieve the desired pressure. For instance, such adjustments can occur as incoming sizing 30 is intermittently supplied to applicator 10. Alternatively, only control valve 528 and pump 520 can be utilized to control fluid flow, wherein control valve 528 includes a regulator block valve. Although not required, a continuous flow of solution 14 can be maintained within header 522 to prevent the settling of solids in the solution 14, and to thereby maintain a proper mixture of the solution 14 and to prevent clogging within the header 522. Alternatively, a header 522 can be utilized that does not continuously circulate the solution 14 through the system 500 and back to the main storage tank 518.

During application of solution 14 to filaments 16, detector 18, which is positioned either at housing 24 or remote from the housing, monitors solution level 20 and sends signal 26 to flow controller 28, which can be a controllable valve, pump, or other device for controlling the flow of the solution between header 522 and applicator 10. In the particular embodiment of the invention shown in FIG. 5, detector 18 is remotely located at pot 92 and monitors the solution level 98 within reservoir 94 that corresponds to solution level 20 within reservoir 22. When the monitored solution level indicates that solution level 20 has dropped below the lower limit 34 of the predetermined range of levels 32 (see FIG. 2), signal 26 instructs flow controller 28 to supply an amount of incoming solution 30 to reservoir 22 to adjust the solution level 20 to a level within the predetermined range of levels 32, and below overflow level 38 (see FIG. 2). In this manner, the solution level 20 remains within the predetermined range of levels 32. In one nonlimiting embodiment of the present invention, flow controller 28 has a first position for allowing a flow of incoming solution 30 into reservoir 22, and a second position for blocking the flow of the incoming solution to the reservoir 22. Further, flow controller 28 is responsive to signal 26 and switches between the first position and the second position to maintain a desired solution level 20 in reservoir 22 within the predetermined range of levels 32. Thus, system 500 advantageously includes direct, one-way fluid connections between main storage tank 518 and each applicator 10, thereby eliminating the recirculation of potentially contaminated or diluted excess sizing solution.

Additionally, as mentioned above, shielding 40 of housing 24 covers reservoir 22 and substantially prevent contaminants from mixing with solution 14 in applicator 10. For instance, in the system 500 shown in FIG. 5, as filaments 16 are pulled from bushing 506, sprayer 512 can direct a mist 514 of atomized liquid, such as water or another coolant, toward the filaments 16. As the droplets of fluid in mist 514 fall toward applicator 10, deflector 42 intercepts at least a portion of the droplets and directs them away from applicator surface 12, and hence from contaminating solution 14 in reservoir 22. Similarly, gutter 50 directs any excess fluids collected on housing 24 away from applicator surface 12. Moreover, because of the close proximity of the edges 78, 80, 81 and 85 (see FIG. 1) of opening 76 to applicator surface 12, and because of the close spacing of deflector 42 to filaments 16, the flow of air associated with the advancing and cooling filaments is directed away from the opening 76, thereby substantially eliminating any blow back effects typically experienced in conventional applicators. As discussed earlier, the larger diameter 60 of second support 56 will also reduce the contaminating effects of blow back. Also, any other airborne contaminants, such as glass particles, are shielded from access to solution 14 in reservoir 22. Thus, shielding 40 covers reservoir 22 and substantially reduces contamination and/or dilution of solution 14 in applicator 10.

Example embodiments of the present invention have now been described. It will be appreciated that these examples are merely illustrative of the invention. Many variations and modifications of the invention will be apparent to those skilled in the art.

What is claimed is:

1. An applicator for applying at least a partial coating of a solution to a filament, comprising:
   an applicator surface operable to at least partially coat a filament with a solution;
   a first reservoir operable to supply the solution to the applicator surface, a volume of the solution in the first reservoir corresponding to a solution level in the first reservoir;
   a second reservoir operable to contain a supply of solution in fluid communication with the solution in the first reservoir such that the solution in the second reservoir has a solution level indicative of the solution level of the solution in the first reservoir; a flow controller and
   a detector for determining the solution level within the second reservoir, the detector operable to generate a signal to the flow controller to control the flow of the solution so as to control the volume of the solution in the first reservoir.

2. The applicator of claim 1, wherein the filament is a glass filament and the solution is a glass fiber sizing composition.

3. The applicator of claim 1, wherein the detector is elected from an electrical detector, a mechanical detector, an energy wave detector, an ultrasonic detector, and a magnetic detector.

4. The applicator of claim 1, wherein the detector is a non-surface contacting detector.

5. The applicator of claim 1, wherein the flow controller is positioned between a source of the solution and the first reservoir to permit flow of the solution from the source to the first reservoir.

6. The applicator of claim 1, wherein the solution level in the first reservoir is maintained within a predetermined range of levels, wherein the first reservoir includes an overflow level, and wherein the predetermined range of levels is below the overflow level.

7. The applicator of claim 1, wherein the applicator surface further comprises an endless belt rotatably supported by at least a first support and a second support, wherein the first support is at least partially positionable below the solution level of the first reservoir and the second support is positionable adjacent to a contact area between the applicator surface and the filament.

8. The applicator of claim 1, further comprising shielding for covering the first reservoir and directing excess external liquid on the shielding away from the solution in the first reservoir, the shielding having an opening, wherein the applicator surface projects from the opening such that the filament is contactable with the applicator surface at the opening.

9. The applicator of claim 8, wherein the filament is a glass filament and the solution is a glass fiber sizing composition.

10. The applicator of claim 8, wherein the shielding further comprises side walls and a top wall of the first reservoir, wherein at least one of the side walls includes an upper edge and the top wall includes a lower edge, and wherein a spacing between the upper edge and lower edge defines the opening.

11. The applicator of claim 8, wherein the shielding further comprises at least one wall defining a top wall of the first reservoir, the top wall further comprising a lower edge defining an upper end of the opening, and further comprising a gutter positioned along the top wall in close proximity to the opening such that the gutter carries the external liquid away from the opening.

12. The applicator of claim 8, wherein the shielding further comprises at least one wall extending over the first reservoir, the at least one wall comprising a plurality of edges, wherein at least a portion of the plurality of edges define at least one edge of the opening.

13. The applicator of claim 12, wherein the shielding further comprises a deflector positioned above the at least one wall and adjacent to the filament for directing excess liquid away from the opening.

14. The applicator of claim 12, wherein at least a portion of the at least one wall extends over at least a portion of the applicator surface.

15. The applicator of claim 1, wherein the applicator surface further comprises a single roller, wherein the single roller is at least partially submerged below the solution level of the first container.

16. The applicator of claim 1, wherein any solution exceeding a height of the first reservoir does not return to the first reservoir.

17. A system for supplying and applying at least a partial coating of a solution to a filament, comprising:
   a main container operable to supply a solution;
   a local reservoir in fluid communication with the main container for receiving the solution from the main container, a volume of the solution in the local reservoir corresponding to a solution level in the local reservoir;
   an applicator surface operable to receive the solution from the local reservoir and apply an at least partial coating of the solution to the filament;
   an auxiliary reservoir operable to contain a supply of solution in fluid communication with the solution in the local reservoir such that the solution in the auxiliary reservoir has a solution level indicative of the solution level of the solution in the local reservoir;
   a flow controller positionable between the main container and the local reservoir to control a flow of solution from the main container to the local reservoir; and
   a detector for monitoring the solution level within the auxiliary reservoir, wherein the detector is operable to generate a signal to the flow controller in response to the monitored solution level of the auxiliary reservoir.

18. The system of claim 17, further comprising shielding for covering the local reservoir and directing excess external liquid on the shielding away from the solution in the local reservoir, the shielding having an opening, wherein the applicator surface projects from the opening such that the filament is contactable with the applicator surface.

19. The system of claim 17, wherein the detector is a non-surface contacting detector.

20. The system of claim 17, wherein the filament is a glass filament and the solution is a glass fiber sizing composition.

21. The system of claim 17, wherein the local reservoir includes an overflow level corresponding to a height of the reservoir such that any solution exceeding the overflow level is prevented from returning to the local reservoir, wherein the solution level in the local container is maintained within a predetermined range of levels, and wherein the predetermined range of levels is below the overflow level.

22. The system of claim 17, wherein the applicator surface further comprises an endless belt rotatably supported by at least a first support and a second support, wherein the first support is at least partially positionable below the solution level and the second support is positionable adjacent to a contact area between the applicator surface and the filament, wherein the solution level in the local container is maintained within a predetermined range of levels, and wherein the predetermined range of levels is such that the applicator surface exits the solution at a constant angle when the solution level of the reservoirs is within the predetermined range of levels.

23. The system of claim 17, wherein the applicator surface further comprises a single roller, wherein the single roller is at least partially submerged below the solution level of the local container.

24. The system of claim 17, wherein any solution exceeding a height of the local reservoir does not return to the local reservoir.

25. An applicator for applying at least a partial coating of a solution to a filament, comprising:
   an applicator surface operable to at least partially coat a filament with a solution;
   a first volume of solution having a top surface corresponding to a solution level of the first volume, the first volume of the solution in communication with at least a portion of the applicator surface;
   a second volume of the solution having a top surface corresponding to a solution level of the second volume and separate from the top surface of the first volume, the solution level of the second volume being indicative of the solution level of the first volume, a flow controller; and
   a detector for determining the solution level of the second volume of the solution, the detector operable to generate a signal to the flow controller to control the flow of the solution so as to control the amount of the solution in the first volume of the solution.

26. The applicator of claim 25, wherein the detector is selected from an electrical detector, a mechanical detector, an energy wave detector, an ultrasonic detector, and a magnetic detector.

27. The applicator of claim 25, wherein the detector is a non-surface contacting detector.

28. The applicator of claim 25, wherein the flow controller is positioned between a source of the solution and the first volume of solution to permit flow of the solution from the source to increase the first volume solution.

29. The applicator of claim 25, further comprising shielding for directing excess external liquid on the shielding away from the solution in the first volume, the shielding having an opening, wherein the applicator surface projects from the opening such that the filament is contactable with the applicator surface.

30. The applicator of claim 25, wherein the first and the second volumes of solution are in separate containers.

31. The applicator of claim 30, wherein any portion of the first volume of solution that exceeds a height of the container for the first volume of solution does not return to the container for the first volume of solution.

32. The applicator of claim 25, wherein the applicator surface further comprises a single roller, wherein the single roller is at least partially submerged below the top surface of the first volume of the solution.

* * * * *